(12) United States Patent
Jaszewski et al.

(10) Patent No.: US 11,794,869 B1
(45) Date of Patent: Oct. 24, 2023

(54) OIL SUMP HOUSING FOR OUTBOARD MOTOR

(71) Applicant: Brunswick Corporation, Mettawa, IL (US)

(72) Inventors: Wayne M. Jaszewski, Jackson, WI (US); Darin C. Uppgard, Oshkosh, WI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

(21) Appl. No.: 17/897,969

(22) Filed: Aug. 29, 2022

Related U.S. Application Data

(63) Continuation of application No. 16/938,486, filed on Jul. 24, 2020, now Pat. No. 11,472,527.

(51) Int. Cl.
  *B63H 21/10* (2006.01)
  *B63H 20/00* (2006.01)
  *F01M 11/04* (2006.01)
  *F01M 11/00* (2006.01)

(52) U.S. Cl.
  CPC ....... *B63H 20/002* (2013.01); *F01M 11/0004* (2013.01); *F01M 11/0408* (2013.01)

(58) Field of Classification Search
  CPC ..... B63H 20/002; B63H 20/14; F02B 61/045; F16H 57/0423; F16H 57/045
  USPC ........................................................ 440/88 R
  See application file for complete search history.

(56) References Cited

U.S. PATENT DOCUMENTS

| | | | | |
|---|---|---|---|---|
| 4,498,875 | A | * | 2/1985 | Watanabe ............. F02B 61/045 440/88 L |
| 4,728,306 | A | | 3/1988 | Schneider |
| 5,404,964 | A | * | 4/1995 | Zinsmeyer ............ F04D 29/063 184/6.27 |
| 5,487,687 | A | * | 1/1996 | Idzikowski ........... F02B 61/045 440/88 L |
| 5,671,532 | A | * | 9/1997 | Rao .......................... F02F 7/00 29/447 |
| 6,375,526 | B2 | | 4/2002 | Ikuma et al. |
| 6,612,272 | B2 | | 9/2003 | Kato et al. |
| 6,675,749 | B2 | | 1/2004 | Osakabe |
| 6,808,432 | B1 | | 10/2004 | Davis et al. |
| 7,001,231 | B1 | | 2/2006 | Halley et al. |
| 7,097,522 | B1 | | 8/2006 | Scherer, III et al. |

(Continued)

FOREIGN PATENT DOCUMENTS

| | | |
|---|---|---|
| CN | 101323369 | 12/2008 |
| JP | H1172052 | 3/1999 |
| JP | 3219933 | 10/2001 |

*Primary Examiner* — Long T Tran
*Assistant Examiner* — James J Kim
(74) *Attorney, Agent, or Firm* — ANDRUS INTELLECTUAL PROPERTY LAW

(57) ABSTRACT

An oil sump housing for an outboard motor of a marine vessel is provided. The oil sump housing includes an upper mounting flange including multiple upper mounting holes, a lower mounting flange including multiple lower mounting holes, and an inner housing wall and an outer housing wall extending between the upper mounting flange and the lower mounting flange. The inner housing wall defines a transmission mounting cavity, and the inner housing wall and the outer housing wall define an oil containment cavity that at least partially surrounds the transmission mounting cavity.

20 Claims, 10 Drawing Sheets

(56) References Cited

U.S. PATENT DOCUMENTS

| | | |
|---|---|---|
| 7,942,138 B1 | 5/2011 | Belter et al. |
| 8,500,501 B1 | 8/2013 | Taylor et al. |
| 8,540,536 B1 | 9/2013 | Eichinger et al. |
| 8,763,688 B2 | 7/2014 | Webb, Jr. |
| 9,376,191 B1 * | 6/2016 | Jaszewski ............ B63H 20/002 |
| 9,475,560 B1 | 10/2016 | Jaszewski et al. |
| 10,047,661 B1 | 8/2018 | Torgerud |
| 10,233,818 B1 | 3/2019 | Reichardt et al. |
| 10,293,910 B1 | 5/2019 | Torgerud et al. |
| 10,315,747 B1 | 6/2019 | Jaszewski |
| 10,336,428 B1 | 7/2019 | Novak et al. |
| 10,800,502 B1 * | 10/2020 | Alby ...................... B63H 5/125 |
| 11,247,761 B1 | 2/2022 | Smith |
| 2006/0196971 A1 | 9/2006 | Lau |
| 2009/0045270 A1 | 2/2009 | Muljono |
| 2015/0013486 A1 | 1/2015 | Kubo |
| 2019/0170243 A1 * | 6/2019 | Brizendine ........... F16H 57/045 |

* cited by examiner

OIL SUMP HOUSING FOR OUTBOARD MOTOR

CROSS-REFERENCE TO RELATED APPLICATION

This application is a continuation of U.S. application Ser. No. 16/938,486, filed Jul. 24, 2020, and such application is hereby incorporated by reference in its entirety.

FIELD

The present disclosure relates to marine vessels and watercraft, and more particularly, pertains to a multifunctional oil sump housing assembly for an outboard motor.

BACKGROUND

U.S. Pat. No. 10,336,428 discloses a marine propulsion device that has an internal combustion engine, an exhaust manifold that conveys exhaust gas from the internal combustion engine, and a cooling water sprayer that is configured to spray a flow of cooling water radially outwardly toward an inner diameter of the exhaust manifold. The cooling water sprayer has a sprayer body that is configured to convey the flow of cooling water radially into the exhaust manifold and a nozzle configured to spray the flow of cooling water radially outwardly in a fan-shaped pattern toward the inner diameter of the exhaust manifold.

U.S. Pat. No. 10,047,66 discloses a fuel module apparatus for a marine engine. The fuel module apparatus includes a housing having a fuel cavity and a fuel pump in the housing. The fuel pump is configured to pump fuel through the fuel cavity from an inlet on the housing to an outlet on the housing. A cooling fluid sprayer sprays cooling fluid onto an outer surface of the housing to thereby cool the housing and the fuel in the fuel cavity.

U.S. Pat. No. 6,808,432 discloses a cooling system for an out drive of a stern drive device that draws water from a body of water in which a marine vessel is operated and conducts the water through a conduit to an outlet end that is configured to direct a stream of water into a space which is defined under a removably attachable cover and above a surface of a heat producing portion of the out drive. The cover contains a turbulently flowing stream of water in the space in order to more efficiently conduct the water in thermal communication with the outer surface of the heat producing portion. Return passages are provided between the cover and the surface of the out drive to allow water to return, under the influence of gravity, back to the body of water from which it was drawn.

Japanese Patent No. 3,219,933 discloses an oil pan cooling structure for an outboard motor, in particular an improvement of the arrangement of the cooling water jetting nozzle to be able to wash away the salt deposited on the outer surface of the oil pan.

Each of the above patents is hereby incorporated herein by reference in its entirety.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

In certain examples disclosed herein, an oil sump housing for an outboard motor of a marine vessel includes an upper mounting flange including multiple upper mounting holes, a lower mounting flange including multiple lower mounting holes, and an inner housing wall and an outer housing wall extending between the upper mounting flange and the lower mounting flange. The inner housing wall defines a transmission mounting cavity, and the inner housing wall and the outer housing wall define an oil containment cavity that at least partially surrounds the transmission mounting cavity.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clearness and understanding. No unnecessary limitations are to be inferred therefrom beyond the requirement of the prior art because such terms are used for descriptive purposes only and are intended to be broadly construed.

Conventional outboard motors may utilize complicated multipart assemblies to house transmissions, collect oil drained from the engine, and direct cooling fluid onto the transmission and engine oil. Higher than desired engine and transmission oil operating temperatures require temperature reduction systems to lower the temperatures to satisfactory levels for optimum engine performance and durability. At the same time, motor packaging constraints have become more stringent as engines require higher volumes of oil and structural isolation mounting components consume space within the motor footprint. The inventors of the present disclosure have recognized that minimizing the number of the parts utilized to house the transmission and cool the oil collected in an oil sump using a multifunctional oil sump assembly would therefore be useful.

Figure 1:
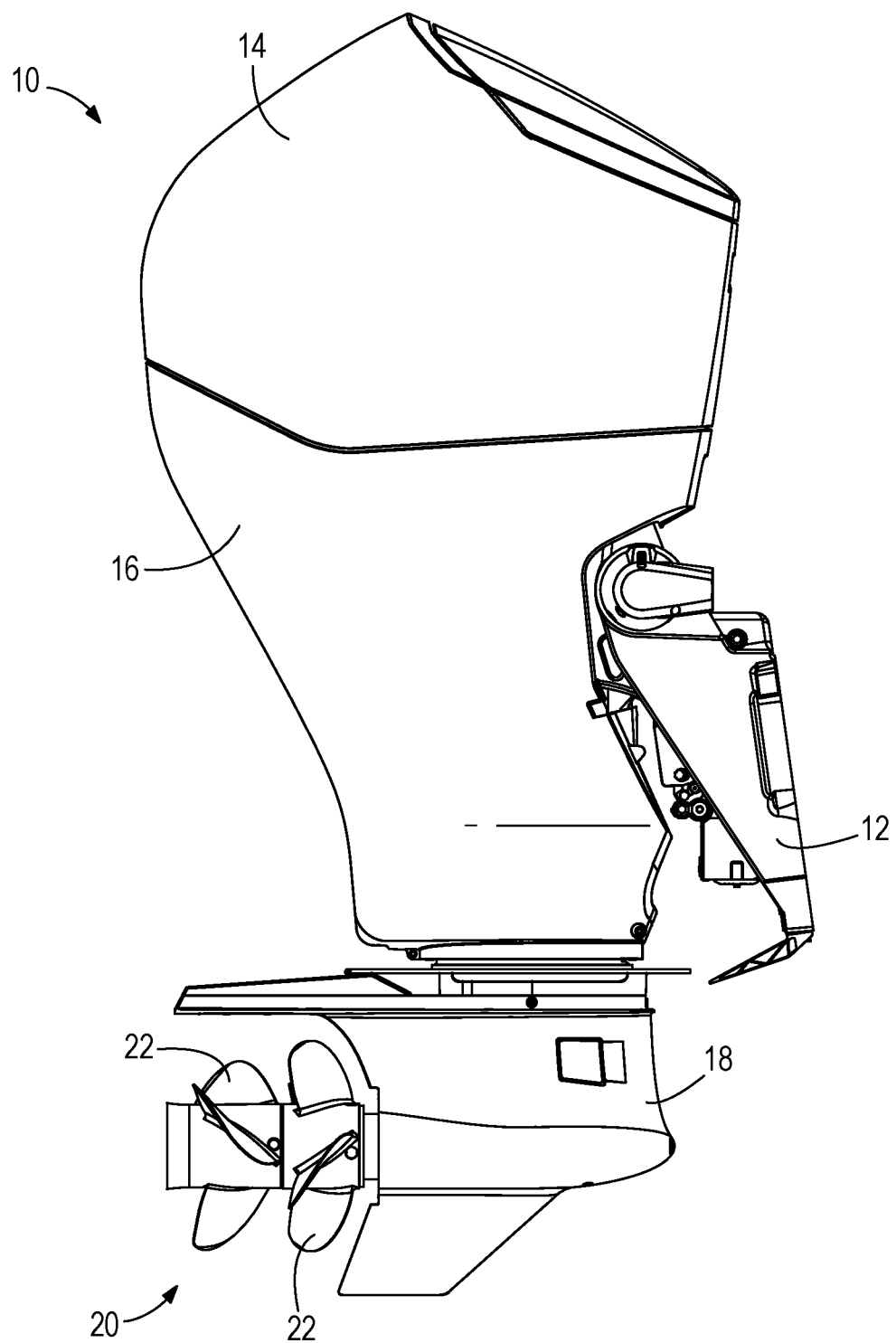
FIG. 1 is a side view of an outboard motor.

FIG. 1 illustrates a starboard side view of an outboard motor or propulsion device 10 in accordance with an exemplary preferred embodiment of the present disclosure. The outboard motor 10 is configured to be coupled to a transom of a marine vessel (not shown) via a transom bracket 12. A trim actuator may be coupled to the outboard motor 10 and the transom bracket 12 to trim the outboard motor 20 about a horizontal trim axis.

The outboard motor 10 includes an upper cowl portion 14 and a lower cowl portion 16 that serve to house and protect various components of the motor 10, described in further detail below with reference to FIGS. 2 and 3. A gearcase assembly 18 is positioned below the lower cowl portion 16. The gearcase assembly 18 houses a propeller assembly 20 having propeller blades 22. Rotation of the propeller assembly 20 causes the propeller blades 22 to impart a thrust force that propels the marine vessel.

It should be noted that the present disclosure generally uses the terms outboard motor and propulsion device synonymously. Moreover, the present disclosure also applies in the context of inboard motors, stern drives, jet drives, pod drives, and any other device capable of propelling a vessel in water.

Figure 2:
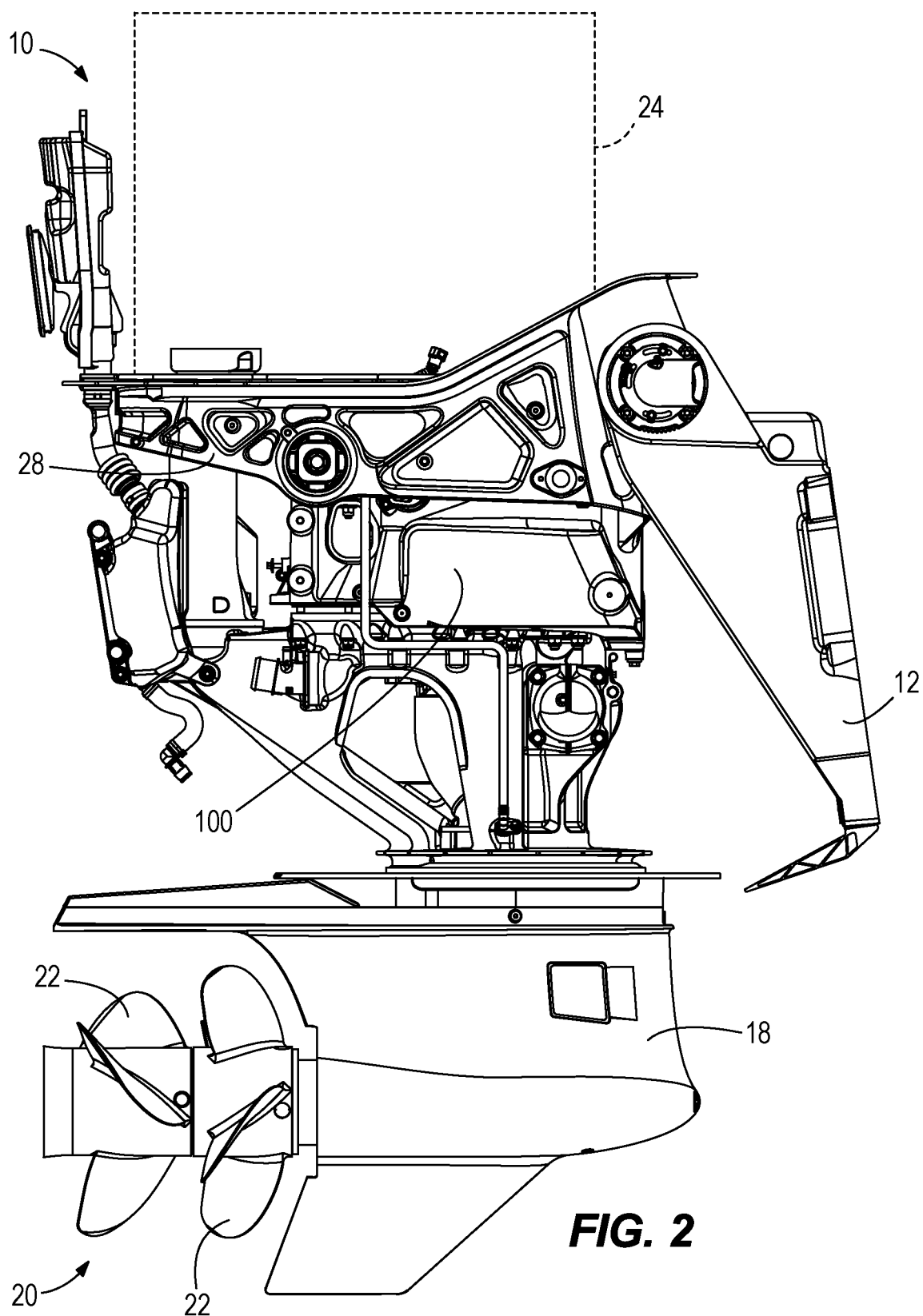
FIG. 2 is a side view of the outboard motor of FIG. 1 with the cowl removed.
Figure 3:
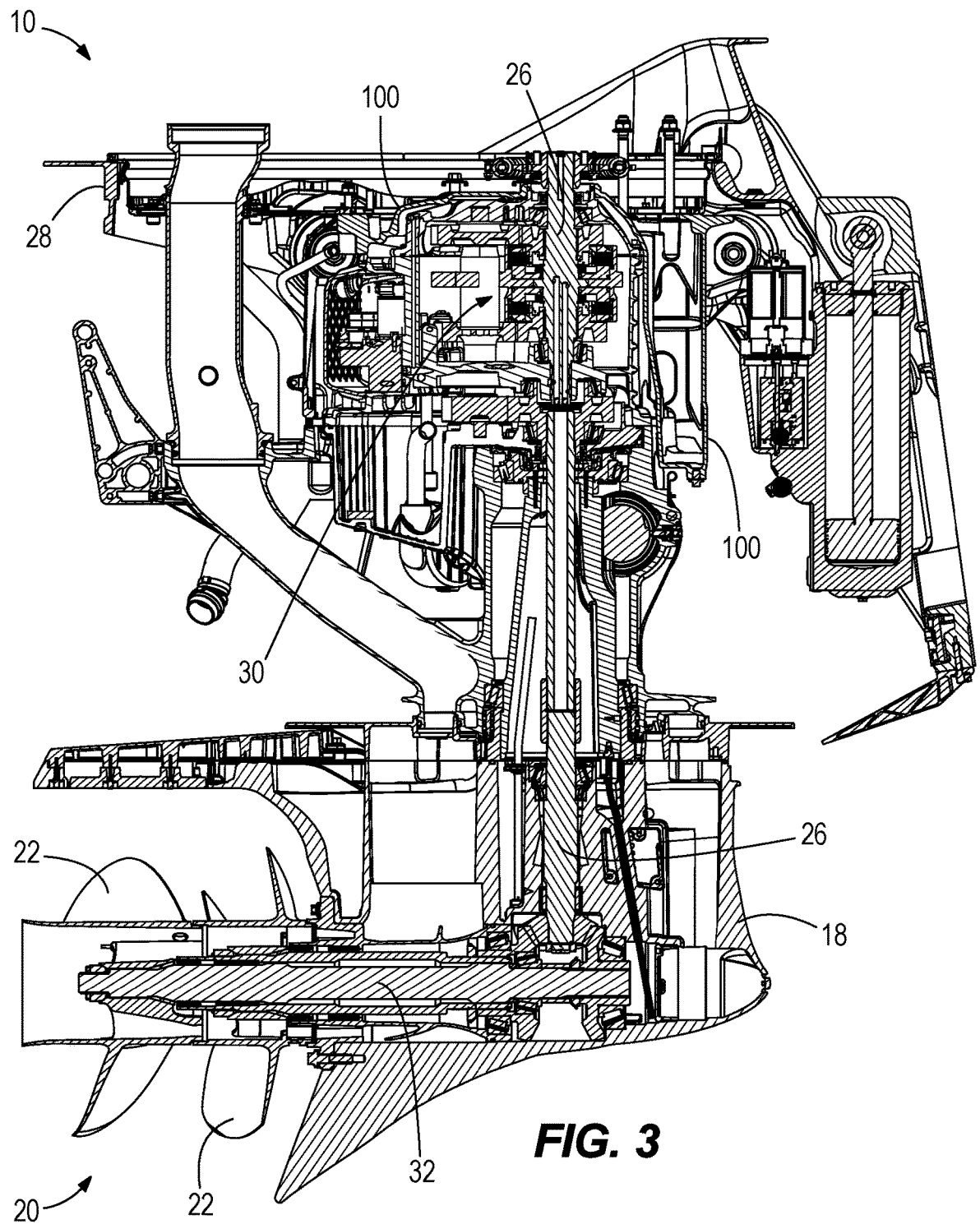
FIG. 3 is side cross-sectional view of the driveshaft assembly of the outboard motor of FIG. 1.

Referring now to FIGS. 2 and 3, starboard side and cross-sectional views of the outboard motor 10 with the cowl portions 14, 16 removed are respectively depicted. As is conventional and thus not shown in detail, the outboard motor 10 has an engine or powerhead 24 that causes rotation of a generally vertically extending driveshaft 26 (shown in FIG. 3). In an exemplary implementation, the engine 24 is supported by an isolation mounting cradle 28 that is coupled to the transom bracket 12. The isolation mounting cradle 28 may act to dampen vibrations induced by the engine 24 and other components to reduce the transmission of induced resonance and vibration running through the hull, cabin, and instruments of the marine vessel, resulting in quieter, more comfortable travel. In other implementations, the engine 24 may be mounted to the transom bracket 12 using a different structural member.

The type of engine 24 can vary, and for example can be an internal combustion engine or electric motor and/or any other mechanism for causing rotation of the driveshaft 26. The driveshaft 26 is shown to extend into an oil sump assembly 100 located below the engine 24. Described in greater detail below with reference to FIGS. 4-7, the oil sump assembly 100 includes a multifunctional housing that includes an oil containment cavity, a transmission housing cavity, and an integrated cooling system. The oil containment cavity collects and stores oil that drains from the engine 24. The driveshaft 26 is shown to be coupled to a transmission 30 that is mounted within the transmission housing cavity for engaging forward, reverse, and neutral gear positions of the outboard motor 10. By combining oil sump and transmission mounting functions into a single housing component, both the number of parts and the package size of the outboard motor 10 may be reduced, resulting in a simpler, more efficiently packaged outboard motor 10.

Still referring to FIG. 3, beneath the oil sump assembly 100, a lower end of the driveshaft 26 is shown to be coupled to the propeller blades 22 of the propeller assembly 20 via a substantially horizontally-aligned propeller shaft 32 located in the gearcase assembly 18. Rotation of the driveshaft 26 causes rotation of the propeller shaft 32, which in turn causes rotation of the propeller blades 22 of the propeller assembly 20. The type of propulsor can vary, and for example can be a propeller, impeller, and/or any other mechanism for propelling the marine vessel in water.

Turning now to FIGS. 4-7, views of the multifunctional oil sump assembly 100 are depicted in accordance with an exemplary preferred embodiment of the present disclosure. Specifically, FIGS. 4 and 5 respectively depict top and bottom perspective views of the oil sump assembly 100. The oil sump assembly 100 is shown to include an oil sump housing 102 with fore and aft isolation mounts 104, 106. The fore and aft isolation mounts 104, 106 include generally frustonical-shaped bodies with central openings formed therethrough. The isolation mounts 104, 106 may be utilized to mount the outboard motor 10 to the isolation mounting cradle 28 that is coupled to the transom bracket 12 and/or the like, for supporting the outboard motor 10 with respect to the transom of a marine vessel.

Figure 4:
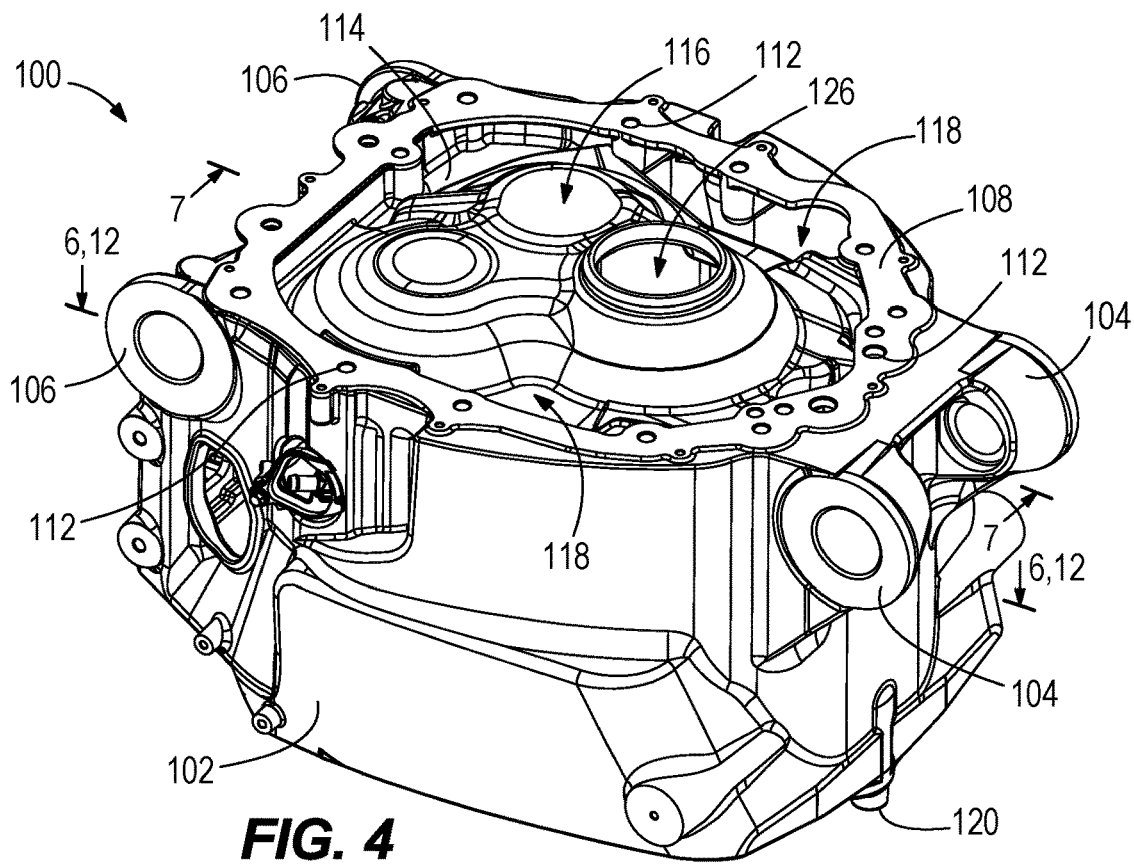
FIG. 4 is a perspective view of an oil sump assembly used in the outboard motor of FIG. 1.
Figure 5:
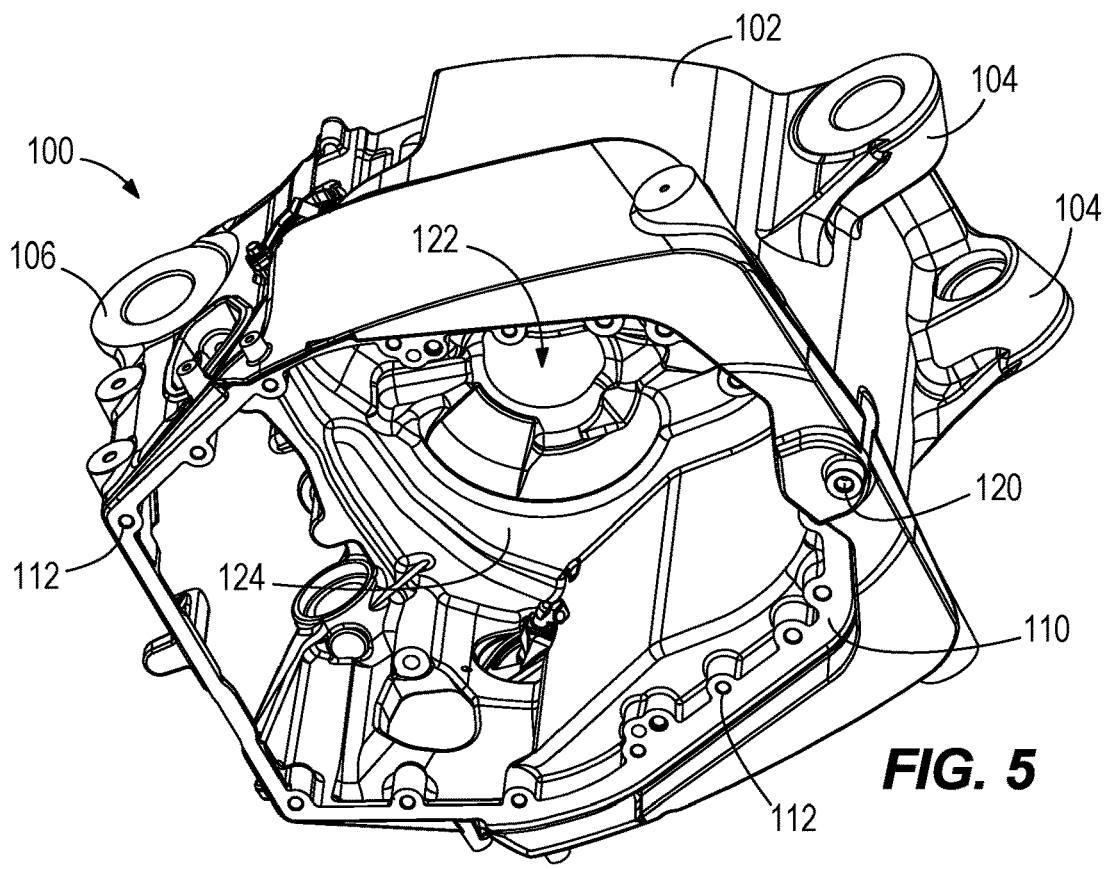
FIG. 5 is another perspective view of the oil sump assembly of FIG. 4.

The oil sump assembly 100 may be secured to the other components of the outboard motor 10 using an upper mounting flange 108 (depicted in FIG. 4) and a lower mounting flange 110 (depicted in FIG. 5). In an exemplary implementation, the approximate (i.e. ±10%) distance between the upper mounting flange 108 and the lower mounting flange 110 is 260 mm (10.25 inches). Each of the mounting flanges 108, 110 includes multiple mounting holes 112 formed therethrough. In an exemplary implementation, each of the mounting holes 112 is a threaded hole that is configured to receive a threaded fastener (e.g., bolts, screws). For example, the mounting holes 112 of the upper mounting flange 108 may be configured to receive fasteners that removably couple the powerhead 24 to the oil sump housing 102, while the mounting holes 112 of the lower mounting flange 110 may be configured to receive fasteners that removably couple a lower engine housing portion to the oil sump housing 102.

Referring specifically to FIG. 4, an upper surface 114 of an internal cavity wall 116 is shown. The upper surface 114 is positioned at least partially below the upper mounting flange 108 to define an oil containment cavity 118. The oil containment cavity 118 is configured to act as a high volume oil sump for the outboard motor 10 by collecting and storing oil that drains from the engine 24. The upper surface 114 may act as a trough that collects and routes the oil around the oil sump housing 102. For example, certain portions of the upper surface 114 may be pitched at an angle relative to a horizontal plane to direct oil downwardly to desired locations within the oil sump housing 102. The pitched portions of the upper surface 114 may further act to split and cause a first portion of oil to be directed to the port side of the oil sump housing 102 and a second portion of oil to be directed to the starboard side of the oil sump housing 102. In an exemplary implementation, the oil containment cavity 118 may store approximately 11.25 liters (11.89 quarts) of oil. An oil drain plug 120 is shown to be coupled to the oil sump housing 102 and positioned below the fore isolation mounts 104. Removal of the drain plug 120 from the oil sump housing 102 permits evacuation of oil stored in the oil containment cavity 118. Further details regarding the oil containment cavity 118 are included below with reference to FIGS. 6 and 7.

Referring now to FIG. 5, a lower surface 124 of the internal cavity wall 116 that defines a transmission mounting cavity 122 is shown. The transmission mounting cavity 122 may be utilized to house the transmission 30. An opening may be provided in the oil sump housing 102 between the aft isolation mounts 106 to provide clearance for a cover of the transmission 30 and to permit passage for the wire harness and cooler hoses of the transmission 30. In an exemplary implementation, the transmission 30 is a multispeed transmission that operatively connects input and output portions of the driveshaft 26, though other power transmission driveline may instead be used. The input portion of the driveshaft 26 is configured to pass through a driveshaft opening 126 to permit coupling to the transmission 30 housed within the transmission mounting cavity 122.

Figure 6:
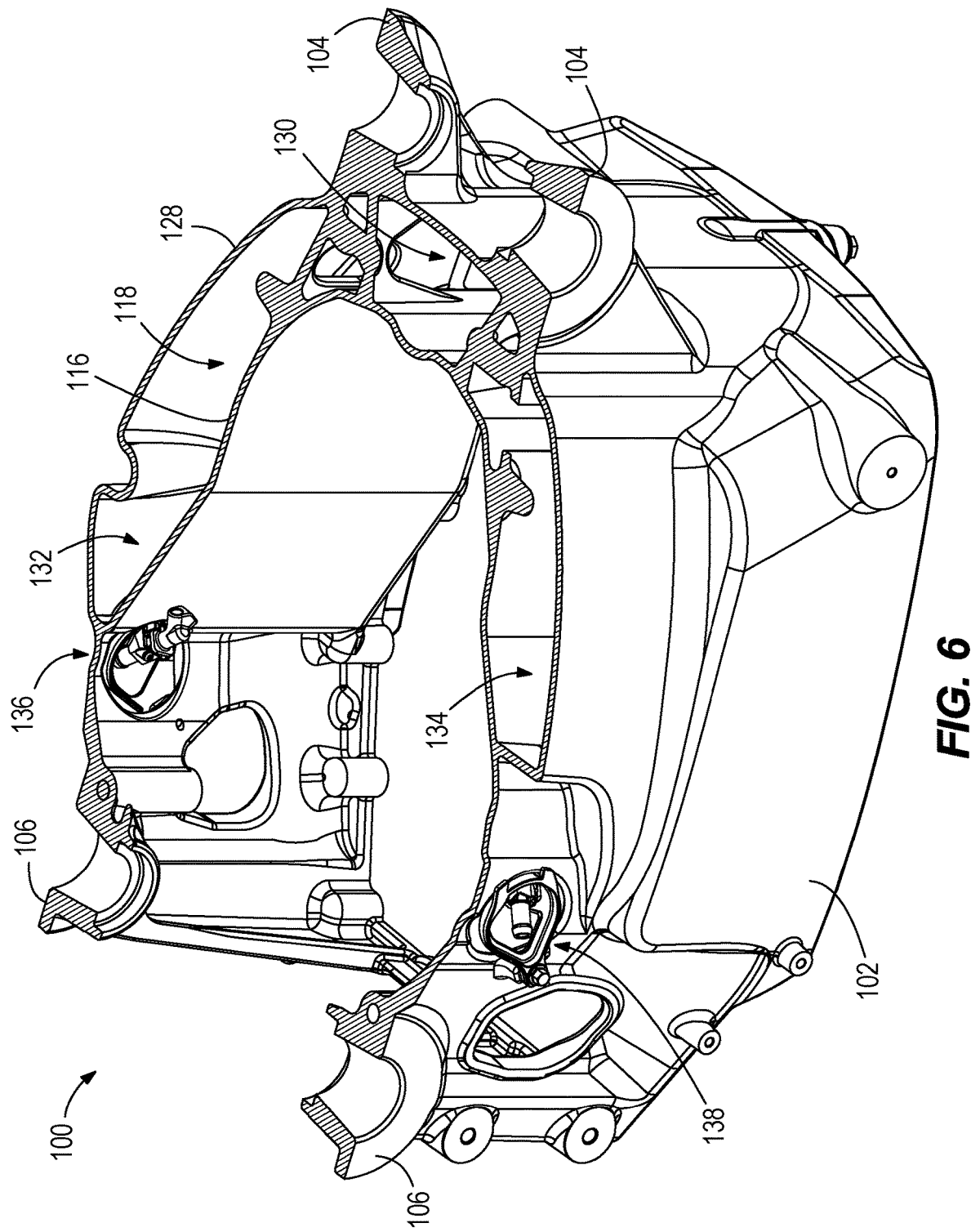
FIG. 6 is a cross-sectional view of the oil sump assembly taken along the line 6-6 of FIG. 4.
Figure 7:
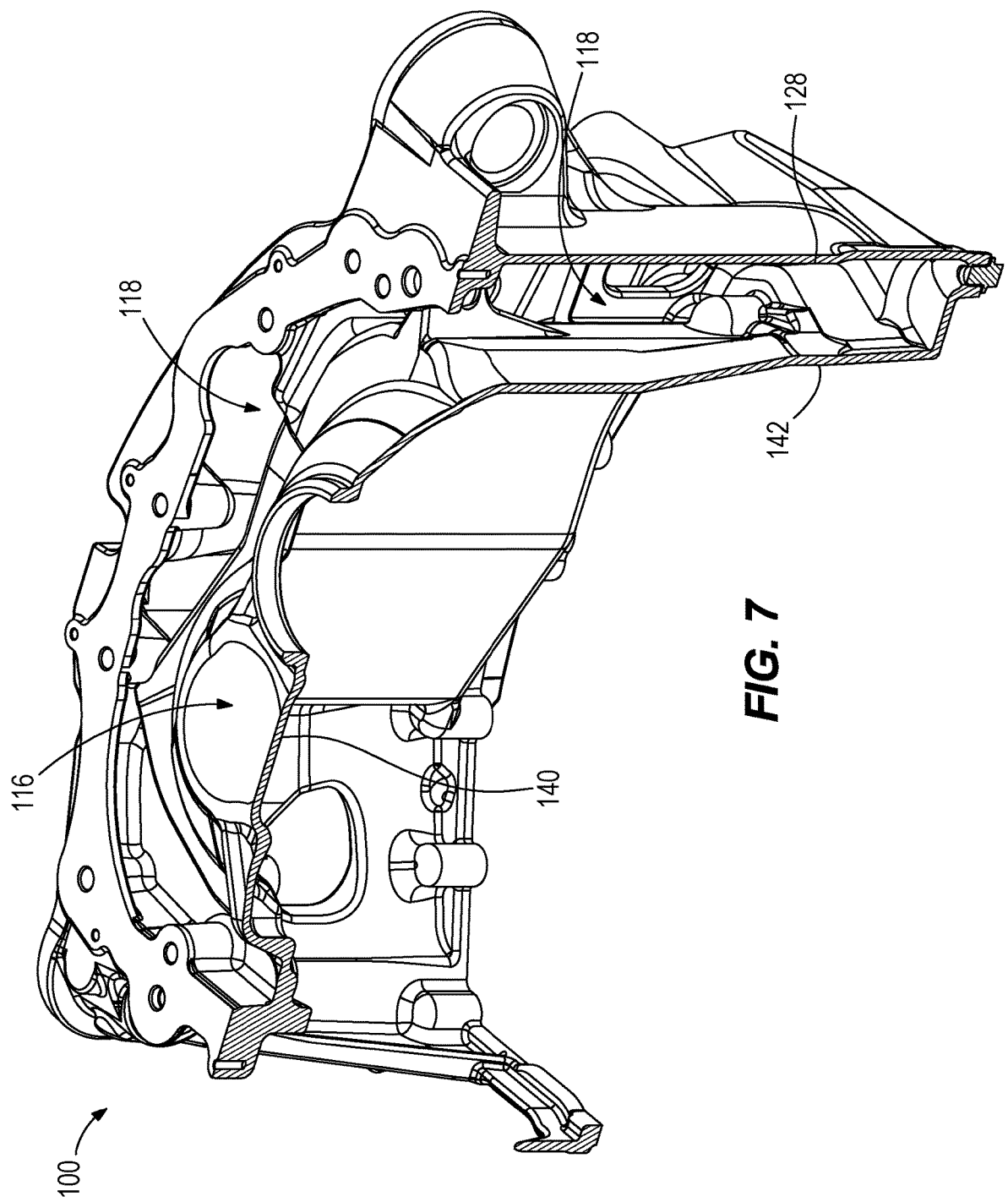
FIG. 7 is a cross-sectional view of the oil sump assembly taken along the line 7-7 of FIG. 4.

FIGS. 6 and 7 respectively depict top and side cross-sectional views of the oil sump assembly 100 to better illustrate the geometry of the oil containment cavity 118. As shown, the oil containment cavity 118 is defined by the internal cavity wall 116 and an external cavity wall 128. Referring specifically to FIG. 6, when viewed from the top, the oil containment cavity 118 is generally U- or horseshoe-shaped, with a center portion 130 of the cavity 118 positioned between the fore isolation mounts 104. A port-side portion 132 and a starboard-side portion 134 of the cavity 118 extend rearwardly from the center portion 130 toward the rear isolation mounts 106. In an exemplary implementation, internal walls separating the center portion 130 from the port-side portion 132 and the starboard-side portion 134 may include multiple oval-shaped openings. The oval-shaped openings permit oil to flow between the portions 130, 132, and 134 and encourage oil mixing, which results in cooling and deceleration of the oil.

The port-side portion 132 of the oil containment cavity 118 is shown to terminate fore of a port-side sprayer assembly 136, while the starboard-side portion 132 of the oil containment cavity 118 is shown to terminate fore of a starboard-side sprayer assembly 138. In operation, the sprayer assemblies 136, 138 are configured to direct cooling water flow within the transmission mounting cavity 122 and onto the internal cavity wall 116 of the oil containment cavity 118 to cool both the transmission 30 and the oil stored within the oil containment cavity 118. Further details of the sprayer assemblies 136, 138 are included below with reference to FIGS. 8-12.

Figure 12:
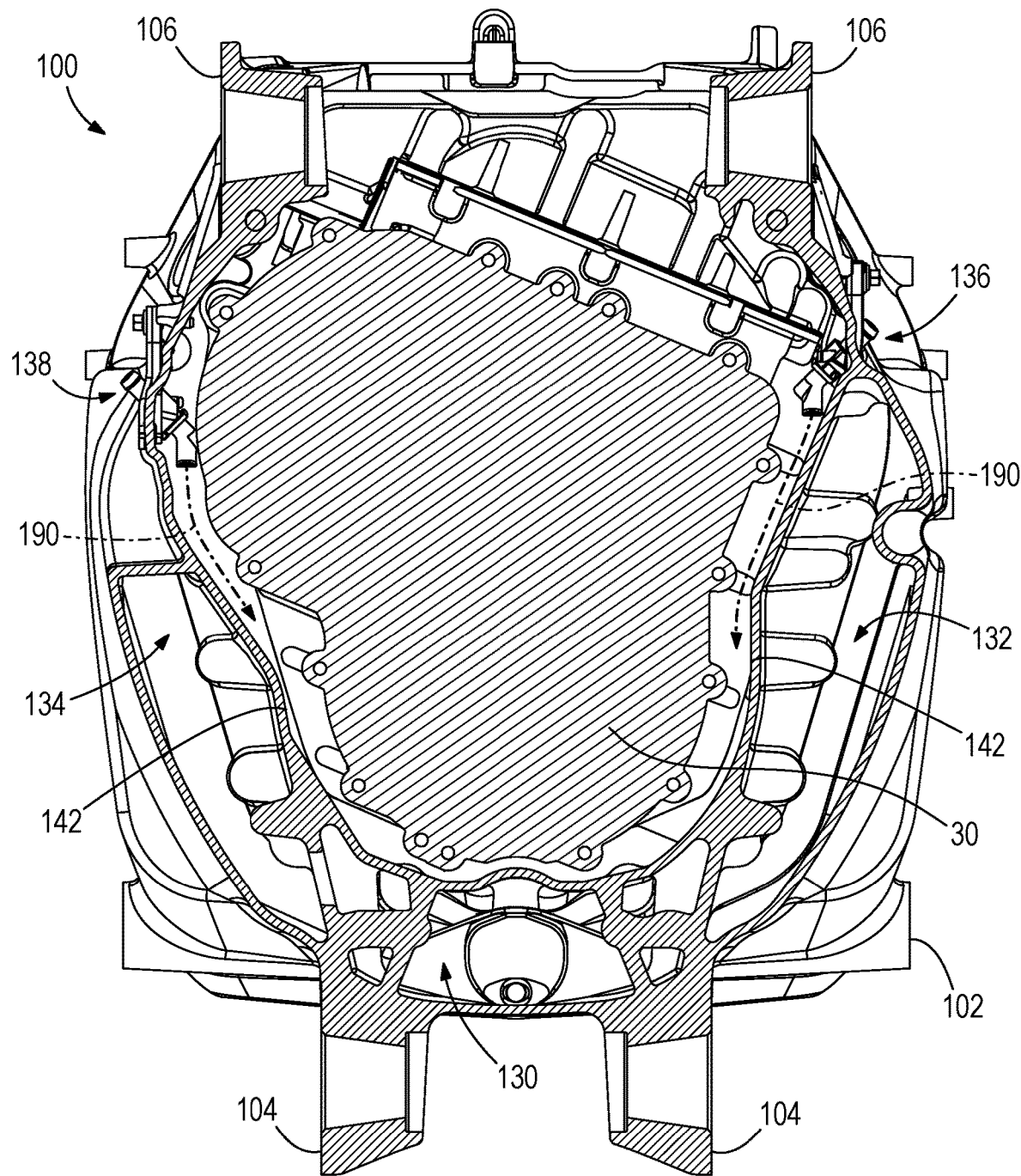
FIG. 12 is a cross-sectional view of the oil sump assembly taken along the line 12-12 of FIG. 4.

As shown in the side cross-sectional view of FIG. 7, the internal cavity wall 116 comprises a generally horizontally-aligned portion 140 and a generally vertically-aligned portion 142. When the transmission 30 is mounted within the transmission mounting cavity 122 (as depicted in FIG. 12), the horizontally-aligned portion 140 spans the entire length of the transmission 30, and the vertically-aligned portion 142 spans the entire height of the transmission 30. The horizontally-aligned portion 140 and the vertically-aligned portion 142 are contiguous, and form the radially innermost extent of the oil containment cavity 118. The radially outermost extent of the oil containment cavity 118 is formed by the external cavity wall 128. Thus, the oil containment cavity 118 is generally L-shaped in side cross-sectional view. In this way, oil that drains from the engine 24 falls onto the horizontally-aligned portion 140 of the internal cavity wall 116 and is permitted to flow unimpeded down the vertically-aligned portion 142, collecting between the vertically-aligned portion 142 of the internal cavity wall 116 and the external cavity wall 128. In an exemplary implementation, a semi-permanent mold casting process may be utilized to fabricate the oil sump housing 102, resulting in a nominal wall thickness of the internal cavity wall 116 of approximately 5 mm. In other implementations, a different casting process may be utilized, yielding a nominal wall thickness of the internal cavity wall 116 of approximately 3 mm.

Figure 8:
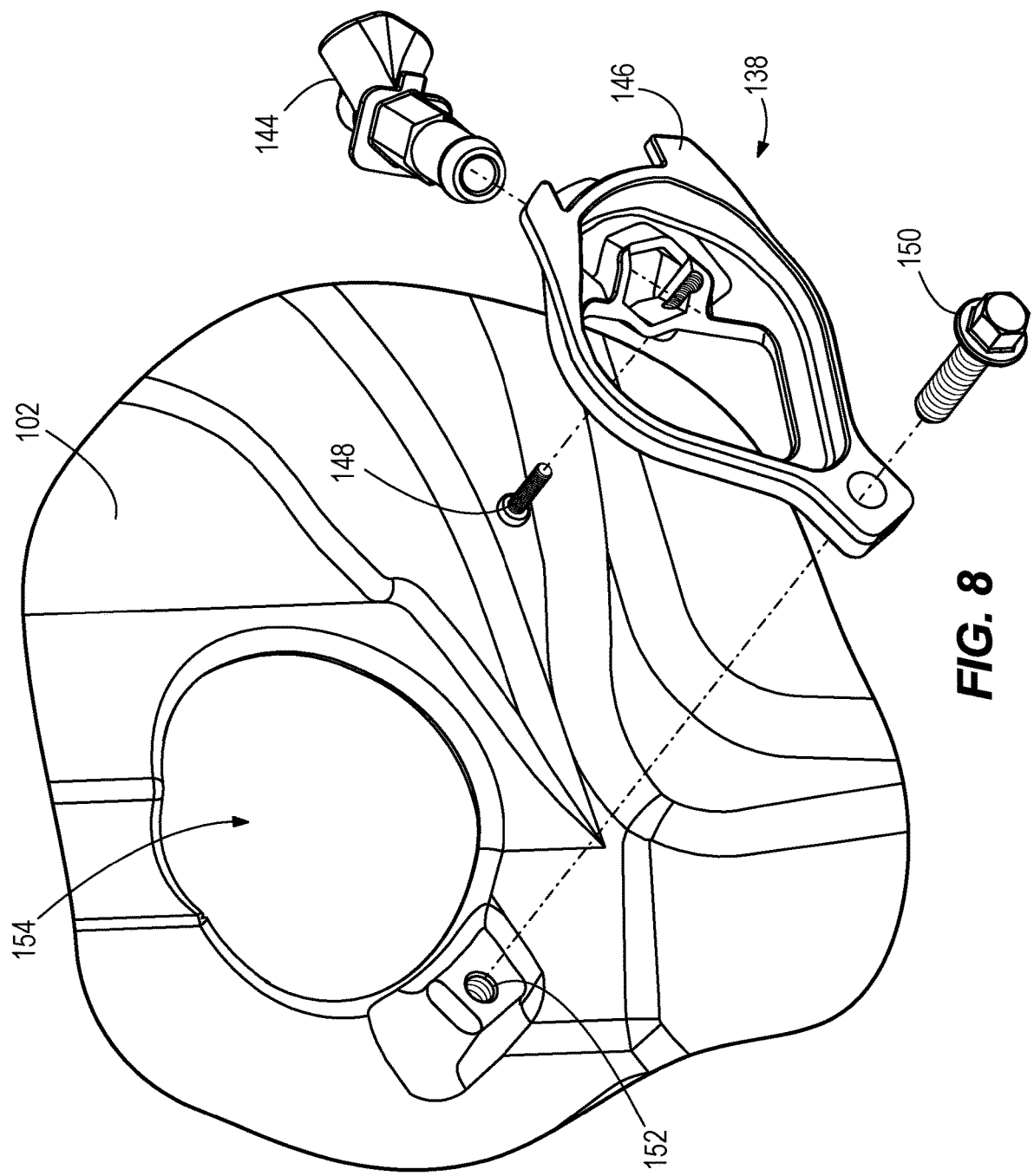
FIG. 8 is an exploded view of a cooling spray nozzle assembly installed in the oil sump assembly of FIG. 4.

Referring now to FIG. 8, an exploded view depicting the coupling of the starboard-side sprayer assembly 138 to the oil sump housing 102 is shown. The sprayer assembly 138 includes a sprayer nozzle 144 and a nozzle mounting bracket 146. The sprayer nozzle 144 may be removably coupled to the nozzle mounting bracket 146 using a nozzle mounting threaded fastener 148. The nozzle mounting bracket 146 may be removably coupled to the oil sump housing 102 using a bracket mounting threaded fastener 150. In an exemplary implementation, a threaded hole 152 is formed in the oil sump housing 102 and configured to threadably couple to the bracket mounting threaded fastener 150. The threaded hole 152 is shown to be positioned adjacent to a nozzle access hole 154. When the coupled sprayer nozzle 144 and mounting bracket 146 are secured to the oil sump housing 102, the sprayer nozzle 144 extends at least partially through the nozzle access hole 154.

Although FIGS. 8-11 are described herein exclusively with respect to the starboard-side sprayer assembly 138, the associated description is equally applicable to the port-side sprayer assembly 136. Indeed, the sprayer nozzle 144, nozzle mounting bracket 146, and mounting fasteners 148, 150 are identical in the sprayer assemblies 136, 138. Advantageously, the use of identical parts results in simpler installation of the sprayer assemblies 136, 138 while reducing the overall complexity of the oil sump assembly 100.

Figure 9:
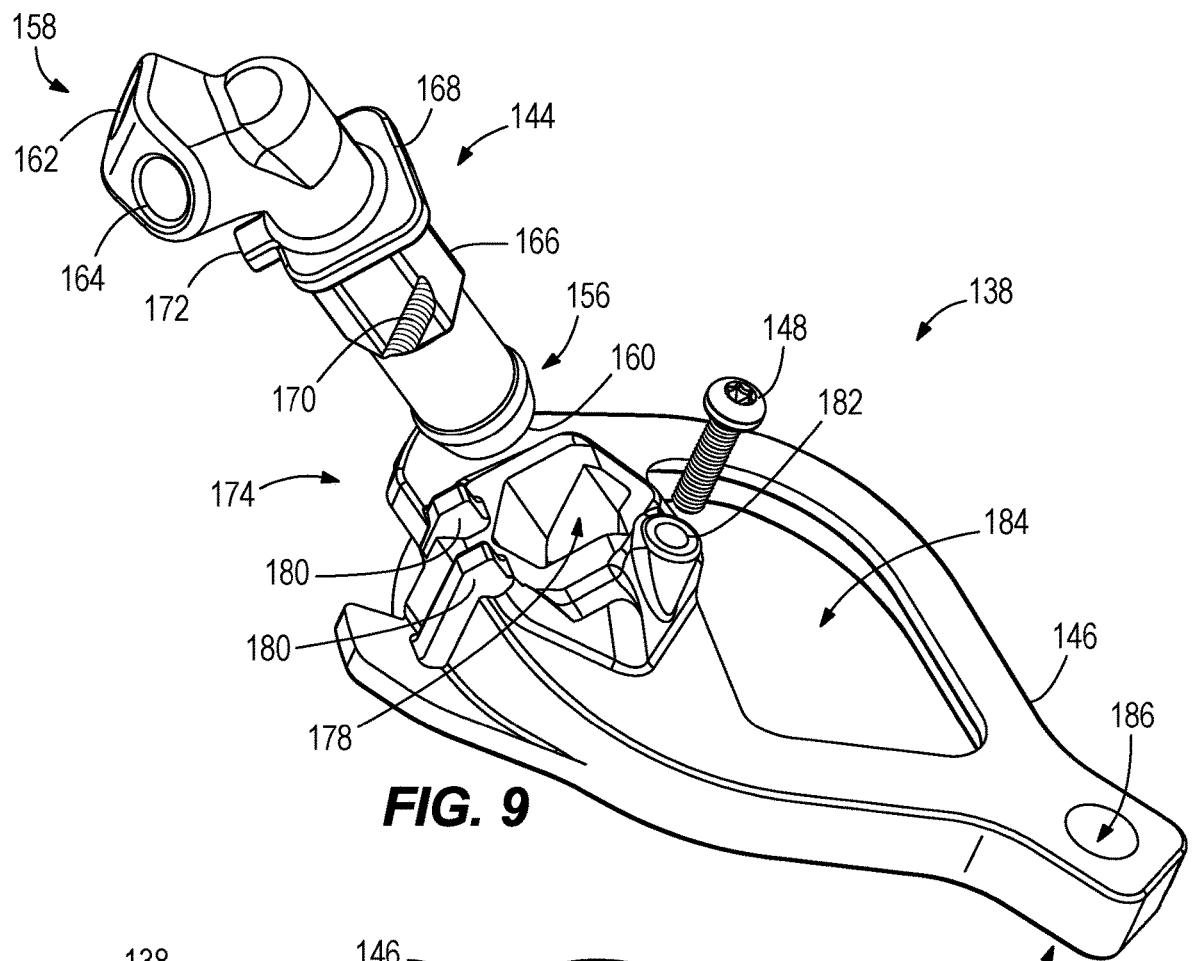
FIG. 9 is another exploded view of the cooling spray nozzle assembly of FIG. 8.
Figure 10:
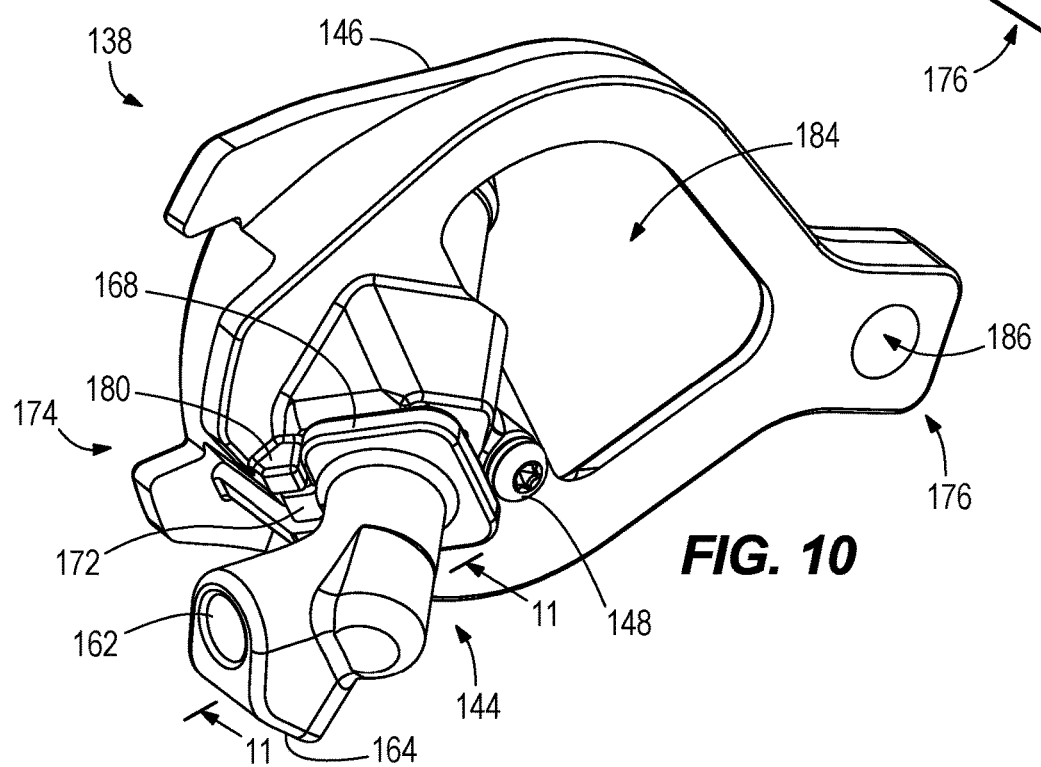
FIG. 10 is a perspective view of the cooling spray nozzle assembly of FIG. 8.
Figure 11:
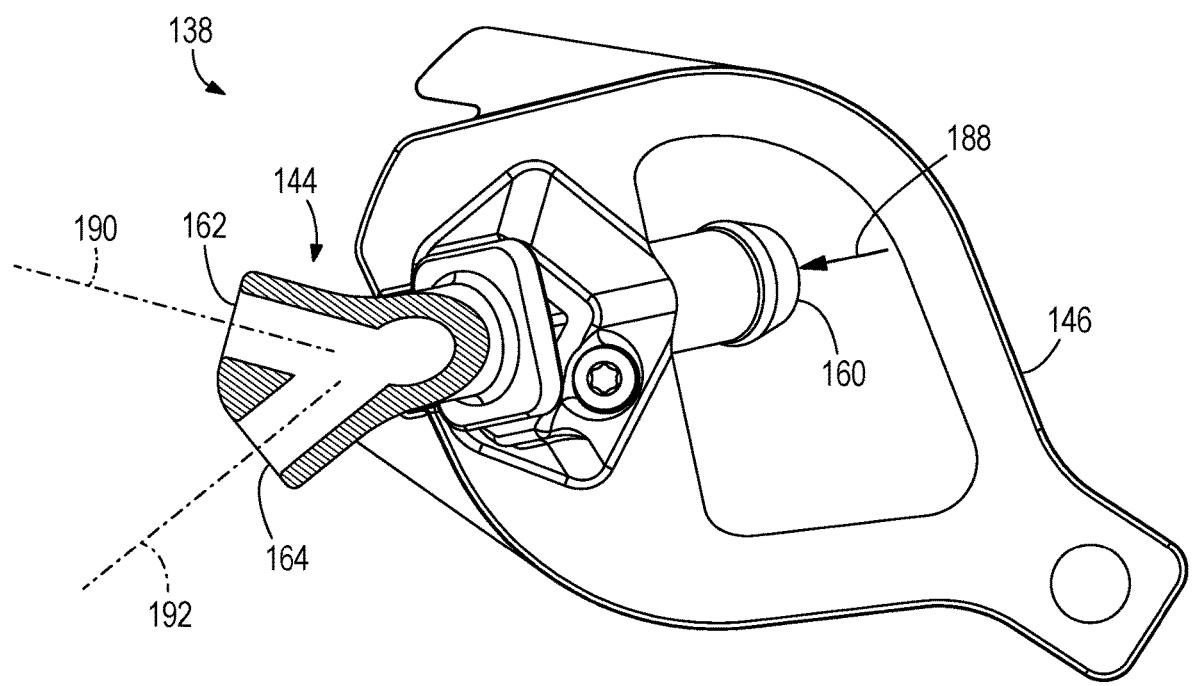
FIG. 11 is a cross-sectional view of the cooling spray nozzle assembly taken along the line 11-11 of FIG. 10.

FIGS. 9-11 depict several views of the sprayer assembly 138 in isolation. FIG. 9 depicts an exploded view of the sprayer assembly 138, while FIG. 10 depicts a perspective view of the sprayer assembly 138 after the sprayer nozzle 144 has been secured in the nozzle mounting bracket 146. The sprayer nozzle 144 is shown to include a generally cylindrical body that extends from a first end 156 to a second end 158. A nozzle inlet 160 is shown to be located proximate the first end 156, and a first nozzle outlet 162 and a second nozzle outlet 164 are shown to be located proximate the second end 158. Between the first end 156 and the second end 158, the sprayer nozzle includes a hexagonal shoulder portion 166 and a locating flange 168.

The mounting bracket 146 is shown to have a generally teardrop-shaped body extending from a first end 174 to a second end 176. Proximate the first end 174, the mounting bracket 146 includes a nozzle opening 178. In an exemplary implementation, the nozzle opening 178 has a hexagonal-shaped perimeter to match the shoulder portion 166 of the sprayer nozzle 144 and prevent rotation of the sprayer nozzle 144 once inserted into the nozzle opening 178, as depicted in FIG. 10. Below the nozzle opening 178, the mounting bracket 146 includes two nozzle locating prongs 180. The nozzle locating prongs 180 are spaced apart from each other and act as keying features such that a locating tab 172 extending from the locating flange 168 of the sprayer nozzle 144 fits between the locating prongs 180 when the sprayer nozzle 144 is inserted into the nozzle opening 178. Although FIGS. 9-11 depict the locating flange 168 as rectangular-shaped, in other implementations, the locating flange 168 may be a different shape, for example, teardrop-shaped. The sprayer nozzle 144 is secured to the mounting bracket 146 using the nozzle mounting threaded fastener 148. In an exemplary implementation, the fastener 148 is threadably coupled to both the partially threaded hole 182 formed in the mounting bracket 146 and the partially threaded hole 170 formed in the shoulder portion 166 of the sprayer nozzle 144.

The mounting bracket 146 is further shown to include a nozzle access opening 184 positioned between the first end 174 and the second end 176. The nozzle access opening 184 permits visual confirmation of the functionality of the spray nozzle 144 when the sprayer assembly 138 is secured to the oil sump housing 102. Proximate the second end 176, the mounting bracket 146 includes a bracket mounting hole 186. In an exemplary implementation, the mounting hole 186 is a through hole that is configured to receive the bracket mounting threaded fastener 150, depicted in FIG. 8.

FIG. 11 depicts a cross-sectional view of the sprayer assembly 138. As shown, the inlet 160 of the sprayer nozzle 144 is supplied with a cooling fluid flow 188. In an exemplary implementation, the cooling fluid flow 188 is raw water drawn from the body of water in which the marine vessel is traveling. The raw water may be supplied to the inlet 160 by an engine water pump. In further implementations, the raw water may be recirculated from the engine 24. In other implementations, a different cooling fluid other than raw water may be supplied to the sprayer nozzle 144.

The cooling fluid flow 188 travels from the inlet 160 through the sprayer nozzle 144 and branches into a first outlet flow 190 through the first nozzle outlet 162 and a second outlet flow 192 through the second nozzle outlet 164. As shown, the first nozzle outlet 162 and the second nozzle outlet 164 are positioned at an acute angle relative to each other. In exemplary implementations, the angle between the first nozzle outlet 162 and the second nozzle outlet 164 may range from 15 to 45 degrees. Preferably, the angle between the first nozzle outlet 162 and the second nozzle outlet 164 is approximately 43 degrees. When secured to the oil sump housing 102, the first nozzle outlet 162 may be angled upwardly relative to a horizontal plane, and the second nozzle outlet 164 may be angled downwardly relative to a horizontal plane. In this way, the surface area reached by the first outlet flow 190 and the second outlet flow 192 may be maximized for optimum cooling.

Turning now to FIG. 12, a top cross-sectional view of the oil sump assembly 100 is shown with the transmission 30 mounted in the transmission mounting cavity 122 of the oil sump housing 102. Sprayer assemblies 136, 138 are shown to be installed respectively on the port and starboard sides of the assembly 100. Though the sprayer assemblies 136, 138 contain identical components, the positioning of the sprayer assemblies 136, 138 is not symmetrical relative to the oil sump housing 102. Instead, to accommodate the asymmetrical housing of the transmission 30, the port side sprayer assembly 136 is shown to be positioned closer to the aft isolation mounts 106, and the starboard side sprayer assembly 138 is shown to be positioned closer to the fore isolation mounts 104. Cooling fluid flow 190 from the sprayer assemblies 136, 138 travels in the annular gap between the transmission 30 and the oil containment cavities 130, 132, 134 to cool both the transmission 30 and the oil collected in the cavities 130, 132, 134. Advantageously, the cooling fluid flow 190 wets the vertically-aligned portions 142 of the internal cavity wall 116 without entering the cavities 130, 132, 134, thus reducing the temperature of the walls and cooling the oil without diluting the oil. After wetting the vertically-aligned portions 142 of the internal cavity wall 116, the cooling fluid continuously drains out of the bottom of the oil sump assembly 110 toward the gearcase assembly 18. In some implementations, cooling fluid flow 190 from the sprayer assemblies 136, 138 may be directed upwardly to cool the transmission 30 and the horizontally-aligned portion 140 of the internal cavity wall 116.

In the present disclosure, certain terms have been used for brevity, clearness and understanding. No unnecessary limitations are to be implied therefrom beyond the requirement of the prior art because such terms are used for descriptive purposes only and are intended to be broadly construed. The different systems and methods described herein may be used alone or in combination with other systems and devices. Various equivalents, alternatives and modifications are possible within the scope of the appended claims.

What is claimed is:

1. An oil sump housing for a marine drive of a marine vessel, the oil sump housing comprising:
   an inner housing wall defining a transmission mounting cavity configured to house a transmission; and
   an outer housing wall, wherein the inner housing wall and the outer housing wall define an oil containment cavity that at least partially surrounds the transmission mounting cavity.

2. The oil sump housing of claim 1, further comprising:
   an upper mounting flange; and
   a lower mounting flange;
   wherein the inner housing wall and the outer housing wall extend between the upper mounting flange and the lower mounting flange.

3. The oil sump housing of claim 1, wherein the inner housing wall comprises a generally horizontal portion and a generally vertical portion, the generally horizontal and vertical portions being contiguous, and wherein the generally vertical portion and the outer housing wall form a generally U-shaped part of the oil containment cavity.

4. The oil sump housing of claim 3, wherein the generally horizontal portion comprises a driveshaft passage formed therethrough.

5. The oil sump housing of claim 3, further comprising a plurality of internal walls positioned between the generally vertical portion and the outer housing wall, the plurality of internal walls configured to define a port-side region, a starboard-side region, and a center region within the U-shaped part of the oil containment cavity.

6. The oil sump housing of claim 5, wherein each of the plurality of internal walls has at least one opening configured to permit passage of oil between the port-side region, the starboard-side region, and the center region.

7. The oil sump housing of claim 5, wherein the generally horizontal portion has at least one pitched area that is positioned at an angle relative to a horizontal plane, the at least one pitched area configured to direct a first portion of oil to the port-side region and a second portion of oil to the starboard-side region.

8. The oil sump housing of claim 1, wherein the oil containment cavity has a volume of at least 10 liters.

9. The oil sump housing of claim 1, wherein the oil sump housing is fabricated using a semi-permanent mold casting process.

10. A marine drive for a marine vessel, the marine drive comprising:
    a powerhead that causes rotation of a driveshaft;
    an oil sump housing located below the powerhead and comprising:
       an inner housing wall defining a transmission mounting cavity; and
       an outer housing wall, wherein the inner housing wall and the outer housing wall define an oil containment cavity that at least partially surrounds the transmission mounting cavity; and
    a transmission located within the transmission mounting cavity and coupled to the driveshaft.

11. The marine drive of claim 10, wherein the oil sump housing further comprises:
    an upper mounting flange; and
    a lower mounting flange;
    wherein the inner housing wall and the outer housing wall extend between the upper mounting flange and the lower mounting flange.

12. The marine drive of claim 11, wherein the powerhead is detachably coupled to the upper mounting flange.

13. The marine drive of claim 10, wherein the inner housing wall comprises a generally horizontal portion and a generally vertical portion, the generally horizontal and vertical portions being contiguous, and wherein the generally vertical portion and the outer housing wall form a generally U-shaped part of the oil containment cavity.

14. The marine drive of claim 13, wherein the generally horizontal portion comprises a driveshaft passage formed therethrough, and wherein a portion of the driveshaft extends through the driveshaft passage.

15. The marine drive of claim 13, wherein the oil sump housing further comprises a plurality of internal walls positioned between the generally vertical portion and the outer housing wall, the plurality of internal walls configured to define a port-side region, a starboard-side region, and a center region within the U-shaped part of the oil containment cavity.

16. The marine drive of claim 15, wherein each of the plurality of internal walls has at least one opening configured to permit passage of oil between the port-side region, the starboard-side region, and the center region.

17. The marine drive of claim 15, wherein the generally horizontal portion has at least one pitched area that is positioned at an angle relative to a horizontal plane, the at least one pitched area configured to direct a first portion of oil from the powerhead to the port-side region and a second portion of oil to the starboard-side region.

18. The marine drive of claim 15, wherein the oil sump housing further comprises an oil drain situated below the center region of the oil containment cavity.

19. The marine drive of claim 10, further comprising an isolation mounting cradle located below the powerhead, the isolation mounting cradle configured to couple the powerhead to a transom of the marine vessel.

20. The marine drive of claim 19, wherein the oil sump housing further comprises a plurality of isolation mounts configured to couple to the isolation mounting cradle.

* * * * *